(12) United States Patent
Klock et al.

(10) Patent No.: US 7,903,116 B1
(45) Date of Patent: Mar. 8, 2011

(54) METHOD, APPARATUS, AND SYSTEM FOR ADAPTIVE PERFORMANCE LEVEL MANAGEMENT OF A GRAPHICS SYSTEM

(75) Inventors: Michael M. Klock, Austin, TX (US); Paul V. Puey, Union City, CA (US); Paul E. Van Der Kouwe, San Jose, CA (US); Jeffrey M. Smith, Union City, CA (US); Kevin J. Kranzusch, Campbell, CA (US)

(73) Assignee: Nvidia Corporation, Santa Clara, CA (US)

( * ) Notice: Subject to any disclaimer, the term of this patent is extended or adjusted under 35 U.S.C. 154(b) by 946 days.

(21) Appl. No.: 10/694,923

(22) Filed: Oct. 27, 2003

(51) Int. Cl.
*G06F 15/00* (2006.01)
*G06F 7/38* (2006.01)
*G06F 1/26* (2006.01)
*G06F 1/00* (2006.01)
*G06T 1/00* (2006.01)
*G06T 1/20* (2006.01)

(52) U.S. Cl. ......... 345/501; 345/506; 712/229; 713/321; 713/322; 713/323; 713/324

(58) Field of Classification Search ............... 345/501, 345/506; 712/229; 713/321–324
See application file for complete search history.

(56) References Cited

U.S. PATENT DOCUMENTS

| | | | | |
|---|---|---|---|---|
| 5,774,704 A * | 6/1998 | Williams | ...... | 713/501 |
| 6,061,802 A * | 5/2000 | Gulick | ...... | 713/400 |
| 6,076,171 A * | 6/2000 | Kawata | ...... | 713/501 |
| 6,112,310 A * | 8/2000 | Jun et al. | ...... | 713/501 |
| 6,397,343 B1 * | 5/2002 | Williams et al. | ...... | 713/501 |
| 6,715,089 B2 * | 3/2004 | Zdravkovic | ...... | 713/322 |
| 6,820,209 B1 * | 11/2004 | Culbert et al. | ...... | 713/501 |
| 6,845,456 B1 * | 1/2005 | Menezes et al. | ...... | 713/320 |
| 6,848,058 B1 * | 1/2005 | Sinclair et al. | ...... | 713/322 |
| 6,874,098 B2 * | 3/2005 | Tamemoto et al. | ...... | 713/500 |
| 6,950,105 B2 * | 9/2005 | Giemborek et al. | ...... | 345/501 |
| 7,065,665 B2 * | 6/2006 | Jacobson et al. | ...... | 713/400 |
| 7,076,681 B2 * | 7/2006 | Bose et al. | ...... | 713/600 |
| 7,114,086 B2 * | 9/2006 | Mizuyabu et al. | ...... | 713/320 |
| 7,149,909 B2 * | 12/2006 | Cui et al. | ...... | 713/322 |
| 7,243,217 B1 * | 7/2007 | Oliver et al. | ...... | 712/222 |

* cited by examiner

*Primary Examiner* — Daniel Washburn
(74) *Attorney, Agent, or Firm* — Cooley LLP

(57) ABSTRACT

A graphics system adapts a performance level to be sufficient to maintain a performance criterion in an acceptable range. In one embodiment, at least one utilization parameter of the core clock domain and the memory clock domain is monitored. In response to detecting an over-utilization condition, the performance level is increased to maintain the desired minimum number of frames per second. In response to detecting an under-utilization condition, the performance level is decreased to reduce power consumption and increase the lifetime of the graphics system.

6 Claims, 5 Drawing Sheets

METHOD, APPARATUS, AND SYSTEM FOR ADAPTIVE PERFORMANCE LEVEL MANAGEMENT OF A GRAPHICS SYSTEM

FIELD OF THE INVENTION

The present invention is generally directed towards controlling performance levels in a graphics system. More particularly, the present invention is directed towards automatically selecting a performance level for a graphics system.

BACKGROUND OF THE INVENTION

A graphics system may have different performance levels. For example, a graphic level may have an associated graphics processing unit (GPU) chip core clock rate and a memory clock rate. Each performance level has an associated display rate, in frames per second, for displaying graphical images of a particular complexity generated from a graphics application.

In the context of graphics systems, some personal computer products permit performance levels to be manually selected. For example, some graphics systems permit developers and enthusiasts to select the core clock rate and the memory clock rate. An example is the GeForce FX5800™ GPU developed by the Nvidia Corporation, of Santa Clara, Calif. A benchmark program may then be run to evaluate performance. An optimum selection of clock parameters may then be set. This provides, for example, game enthusiasts a technique to increase the performance of three-dimensional games.

A drawback of conventional techniques to select performance levels is that they provide less control of performance level than desired.

Therefore, what is desired is an improved apparatus, method, and system to assist a user to optimize performance levels of graphics system.

SUMMARY OF THE INVENTION

An apparatus, system and method are described for automatically adjusting a performance level of a graphics system having two or more performance levels. The graphical activity level is monitored. The performance level is selected based upon the level of graphical activity in the graphics system.

One embodiment of a method of adjusting the performance level of a graphics system comprises: monitoring as a function of time at least one attribute of the graphics system that is indicative of a level of graphical activity; and selecting a performance level for the level of graphical activity to provide a desired minimum display rate. In one embodiment, the performance level is increased when the graphics activity level increases to a level indicating an over-utilized condition, such as when a graphics pipeline or graphics memory becomes over-utilized at the current performance level. The performance level may be decreased when the graphics activity level decreases to a level indicating an under-utilized condition, such as when the graphics pipeline and graphics memory are under-utilized at the current performance level.

One embodiment of a graphics system comprises: a performance level controller configured to monitor, as a function of time, at least one attribute of a graphics system indicative of a graphics activity level and select a performance level sufficient to provide a desired minimum display rate.

One aspect of the present invention is that the performance level is automatically increased when necessary to maintain a sufficient display rate for a pleasant user experience. Additionally, the performance level is automatically reduced to lower performance levels when the graphics activity level drops to a sufficiently low level, reducing the power consumption, cooling requirements, and degradation of the graphics system.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
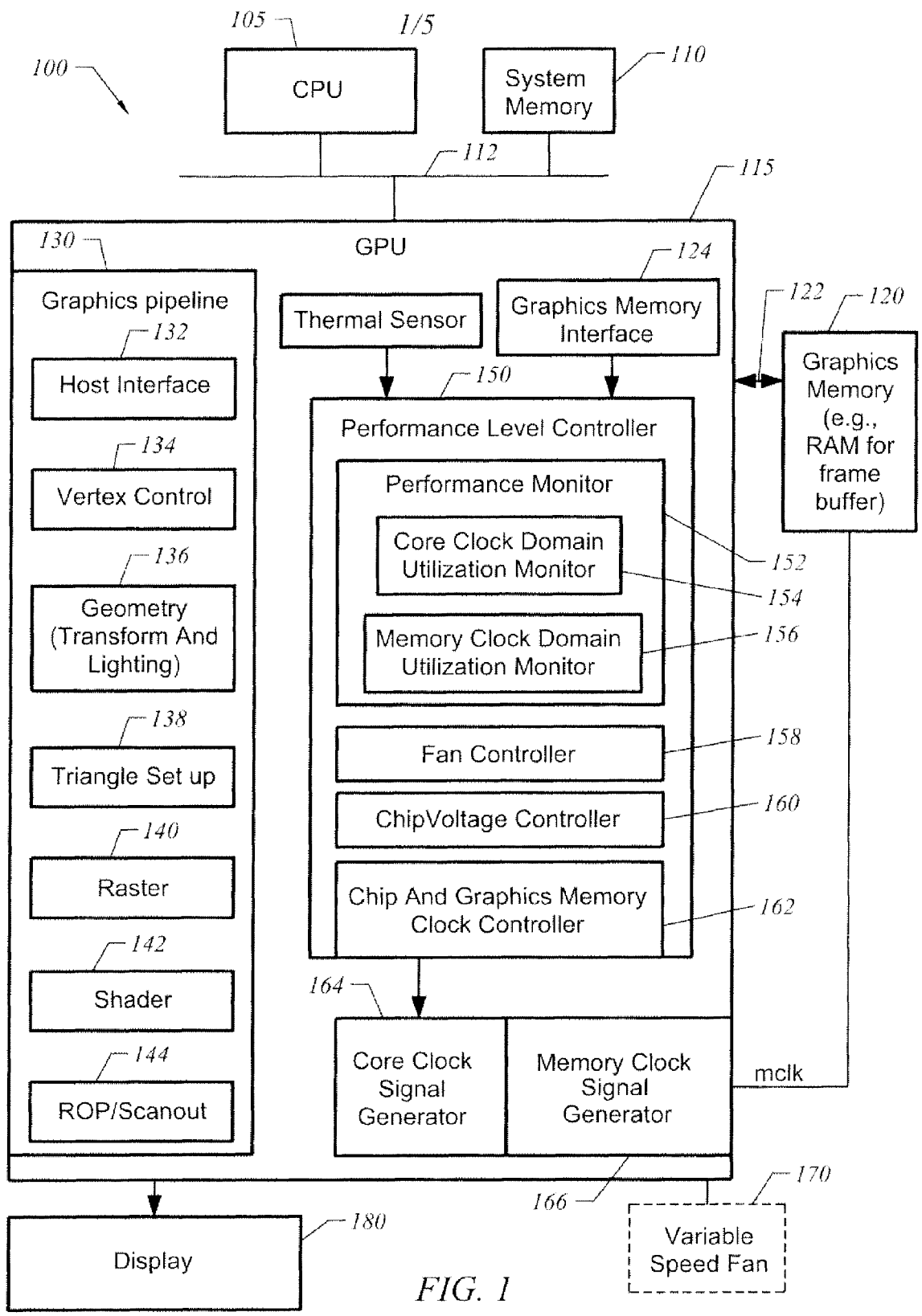
FIG. 1 is a block diagram illustrating a graphics system in accordance with one embodiment of the present invention.

The present invention generally comprises an apparatus, system, and method to dynamically adjust a performance level of a graphics system as a function of a graphics activity level. FIG. 1 is a block diagram illustrating an exemplary graphics system 100 in accordance with one embodiment of the present invention. System 100 includes a central processing unit 105 and system memory 110 coupled to a graphics processing unit (GPU) 115 by a system bus 112. A graphics memory 120, such as RAM memory for a frame buffer, is coupled to GPU 115 by a graphics bus 122. A graphics memory interface 124 is disposed within GPU 115 to couple the graphics bus 122 to GPU 115. A graphics output of GPU 115 is coupled to a display 180, such as a computer monitor. A variable speed fan 170 may be included to cool GPU 115.

GPU 115 includes a graphics pipeline 130 including a plurality of stages. In one embodiment, graphics pipeline 130 includes a conventional host interface stage 132, vertex control stage 134, transform and lighting stage 136, triangle set-up stage 138, raster stage 140, shader stage 142, and ROP/scanout stage 144. The function of the pipeline stages and variations upon those illustrated are well known in the art such that it will be understood that graphics pipeline 130 may be implemented using any known sequence of stages used in the art of graphics processors.

GPU 115 includes control elements 158, 160, 162, 164, and 166 to establish different performance levels. An exemplary GPU having different performance levels is described in pending U.S. patent application Ser. No. 10/295,748, entitled "A Processor Temperature and Mode Adjustment System," filed Nov. 14, 2002, which is commonly owned by the assignee of the present invention, and which is hereby incorporated by reference.

The display rate of system 100 depends upon several factors. First, the complexity of the graphical images that are being processed is an important factor. Complex three-dimensional images require more processing in the GPU. Second, the speed of the GPU and the memory bandwidth are also factors. Consequently, the display rate, in terms of frames per second (frame rate) that are displayed, depends upon the complexity of the graphical images to be rendered, the speed of the graphical pipeline (which depends upon the GPU core clock rate), and the graphics memory bandwidth (which depends, in part, upon the memory clock rate of the graphics memory).

A performance level can be defined by a core clock rate of the GPU, memory clock rate of a graphics memory (e.g., a frame buffer), and other associated settings necessary for the clock rates, such as chip voltage, fan speed (to provide sufficient cooling), and memory timings. In one embodiment, the performance level is selected to be sufficient to maintain at least one performance criterion of the graphics system within an acceptable range. One example of a performance criterion is the frame rate (also known as the display rate), although it will be understood that the performance criterion could comprise one or more other attributes of the graphics system. A high performance level for three-dimensional graphics sufficient to process a demanding graphical application with a minimum display rate may thus include a comparatively high core clock rate and a comparatively high memory clock rate. A lower performance level that is adequate to process a less demanding graphical application, such as one having only two-dimensional graphics, may have a lower core clock rate and/or lower memory clock rate. Since the power consumption of graphics system 100 increases with clock rate, the higher performance levels will tend to consume more power than lower performance levels.

During operation of system 100, the graphical demands upon GPU 115 may vary over time. If the performance level is set too low for a demanding graphical application, then one or more components of the GPU will become over-utilized and the frame rate will decrease compared to a normal display rate i.e., decrease by a significant enough margin that a user may perceive the reduction in display rate. For example, in a high performance three-dimensional graphics game, even a fraction of a second delay in displaying new images is noticeable by a user. However, if the performance level is always set to the highest level then system 100 will consume more power than desired and may also have a shortened lifetime and/or have increased cooling requirements.

In one embodiment of the present invention, performance level controller 150 monitors the level of activity within graphics system 100 and automatically selects a minimum performance level sufficient to prevent a significant slowdown in display rate. It includes a performance monitor 152. Performance monitor 152 includes a core clock domain utilization monitor 154 to monitor graphics pipeline 130 for its utilization (e.g., how busy it is). Performance monitor 152 also includes a memory clock domain utilization monitor 156 to monitor memory interface 124 for its utilization (e.g., how busy it is). In the context of this application, an over utilization condition corresponds to a level of activity for which the frame rate of graphics system 100 (at the present performance level) is likely to be reduced by a significant level such that the slowdown may be noticeable. Conversely, an under-utilization condition corresponds to a level of graphical activity low enough that the frame rate of graphics system 100 is not noticeably reduced by the level of graphics activity. A normal utilization condition corresponds to a range of graphical activity between under-utilization and over-utilization for which the display rate is within a normal range.

Performance level controller 150 also includes control elements to control the parameters that must be set to establish a performance level. In one embodiment, it includes fan controller 158 to set fan speed, a chip voltage controller 160 to set chip voltage; a clock controller 162 to set clock rates, a core clock signal generator 164 coupled to clock controller 162 for generating the core clock signal for the GPU; and a memory clock signal generator coupled to clock controller 162 for generating the memory clock signal for the graphics memory. In one embodiment, the memory clock signal generator is comprised of a two-stage phase locked loop (PLL).

Performance level controller 150 may be implemented as hardware, software, or a combination of hardware and software. In one embodiment, its software components reside as executable instruction stored in a memory of GPU 115 (e.g., in a kernel of GPU 115). However, it will also be understood that the software components of performance level controller 150 may reside, at least in part, in system memory 110 and execute on CPU 105. Thus, it will be understood that in an alternant embodiment performance level controller 115 executes in a CPU 105. For this embodiment, performance level controller 115 may receive data and transmit instructions to GPU 115 via system bus 112.

Figure 2:
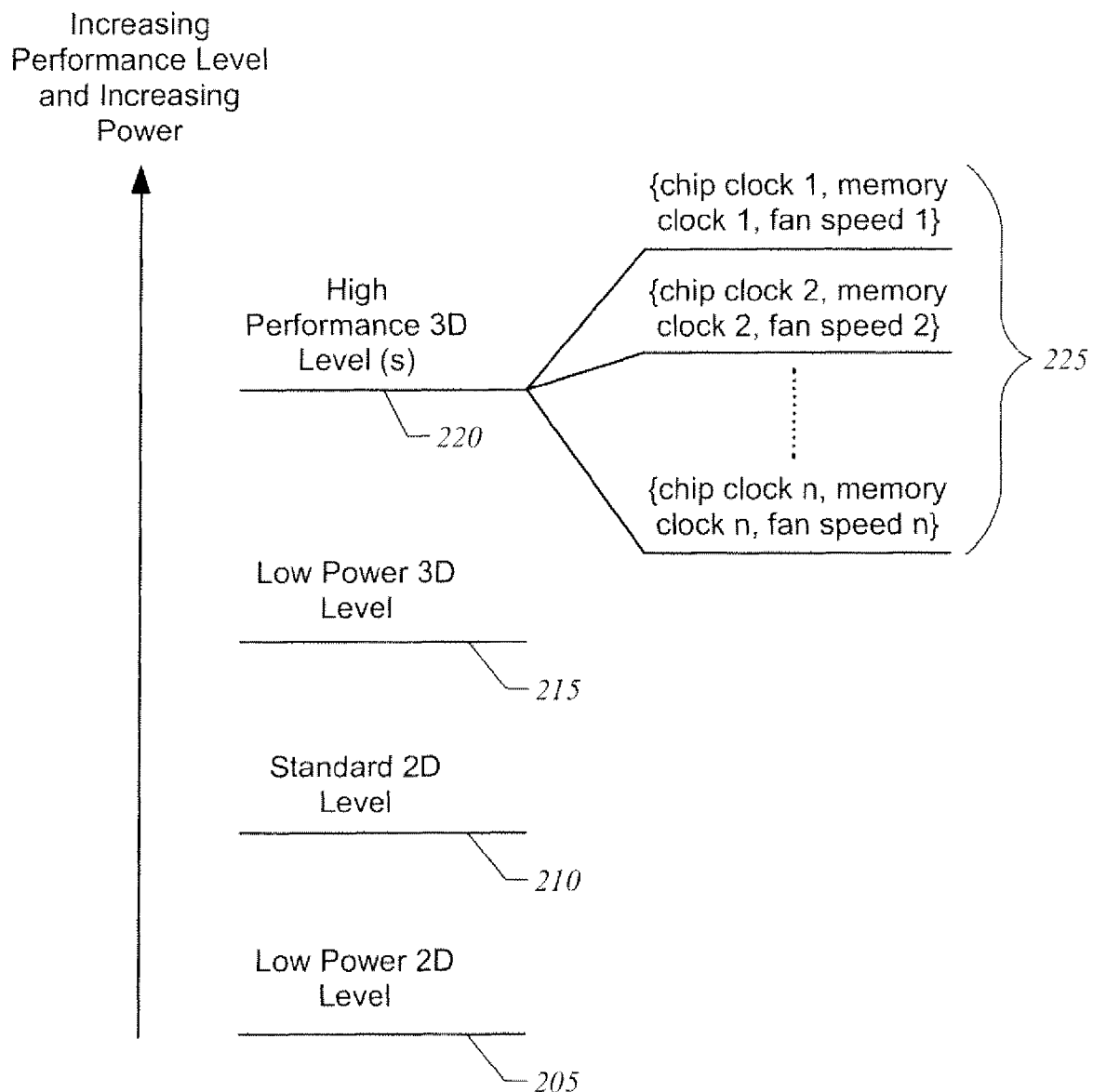
FIG. 2 illustrates performance levels in accordance with one embodiment of the present invention.

Some aspects of the present invention may be understood with regards to FIG. 2. A GPU may have two or more performance levels for which it is desired to select a performance level such that a performance criterion (e.g., frame rate for some graphics applications) is within a desired range. It will thus be understood that the present invention may be applied to a graphics system having two or more performance levels. In one embodiment, the performance levels include a low power two dimensional (2D) graphics performance level 205, a standard two dimensional (2D) performance level 210, a low power three dimensional (3D) performance level 215, and high performance three dimensional (3D) performance level(s) 220. In one embodiment, the high performance three dimensional performance level(s) 220 further comprise an integer number, n, of levels 225, each level having its own set of core clock rates and memory clock rates.

Each performance level 205, 210, 215, 220 has associated operating parameters. These may include, for example, processor core clock rate, memory clock rate, fan speed of a fan used to cool the GPU, chip voltage, and memory timing parameters. For many operating conditions, the performance (in frames per second for a test program having a pre-selected level of graphical complexity) increases with increasing core clock rate and increasing memory clock rate. The highest performance levels also tend to have the highest GPU chip voltage. Consequently, the highest performance levels tend to have the highest power consumption, shortest lifetime, and greatest cooling requirements.

The performance level required to display a particular graphics application at a minimum number of frames per second will depend upon how busy the graphics pipeline and graphics memory are. If a critical component, such as the graphics pipeline or graphics memory, is over-utilized then the display rate may have a significant enough decrease that the slowdown in display rate becomes noticeable to a user.

Figure 3:
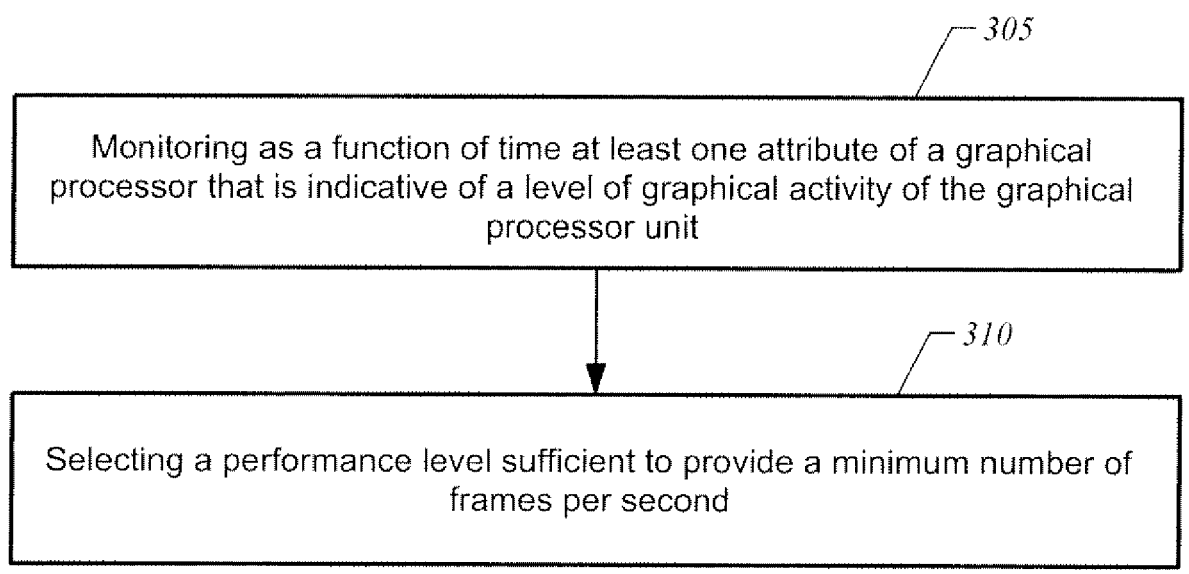
FIG. 3 is a flowchart illustrating a method of adjusting performance levels in accordance with one embodiment of the present invention.

Referring to the flow chart of FIG. 3, in the present invention one or more parameters of the GPU, such as activity in a graphics pipeline and in a graphics memory interface, is monitored 305 versus time as an indicator of graphics activity level. A performance level is selected 310 to display graphical images with a minimum number of frames per second. The frame rate may be a default frame rate, a user selectable frame rate, or be set by monitoring an attribute of an executing graphics application.

Figure 4:
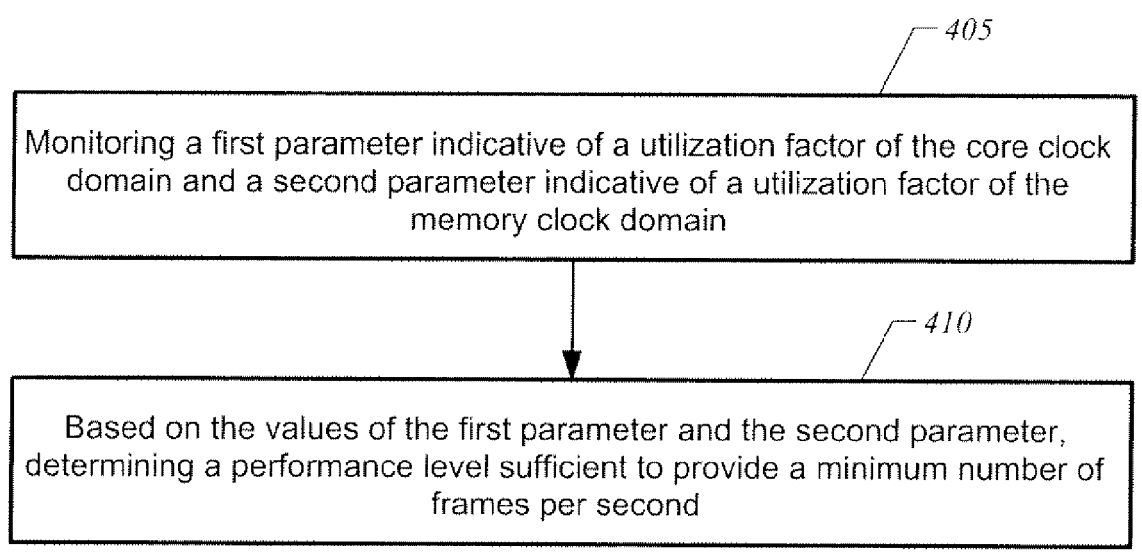
FIG. 4 is a flowchart illustrating a method of adjusting performance levels in accordance with one embodiment of the present invention.

The performance level may be selected using a logical condition having one or more parameters indicative of a level of graphics activity. Referring to the flow chart of FIG. 4, in one embodiment, the performance level controller monitors 405 a first parameter indicative of a core clock domain utilization factor and a second parameter indicative of a memory clock domain utilization factor. The performance level controller determines 410 a performance level likely to provide a minimum number of frames per second.

Figure 5:
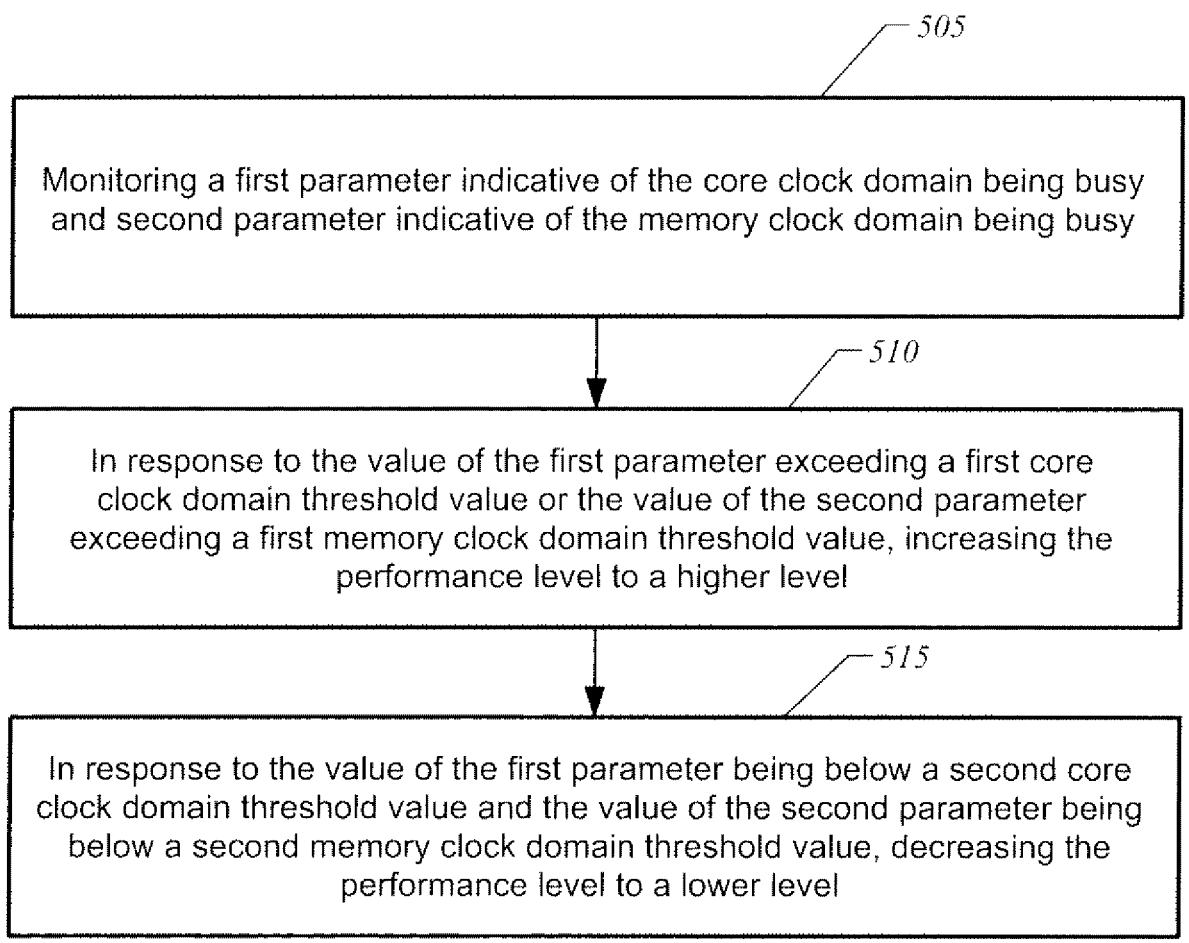
FIG. 5 is a flowchart illustrating a method of adjusting performance levels in accordance with one embodiment of the present invention.

FIG. 5 is a flow chart illustrating an example of an implementation in which the performance level controller selects a performance level by comparing the first and second parameters against threshold values indicative of over-utilization and under-utilization. The performance level controller monitors 505 the first parameter indicative of the core clock domain being busy and a second parameter indicative of the memory clock domain being busy. In one embodiment, if either of the parameters exceeds a threshold value indicating over-utilization, the performance level controller increases 510 the performance level. In one embodiment, it increments the performance level to the next highest level. However, in one embodiment if both of the parameters are below a threshold indicating under-utilization, the performance level controller decreases 515 the performance level (for the case of the GPU being already at the lowest performance level, no change is required). Note that if the parameters are in a normal utilization range (between under-utilization and over-utilization) that the performance level remains unchanged since in this range of utilization any slowdown in display rate associated with the utilization level of the graphics system is insignificant to a user, i.e., is so small a reduction in display rate that it is unlikely that a normal user can perceive it.

The threshold levels for over-utilization and under-utilization may be determined empirically, such as by running graphics applications of a selected complexity and observing whether the graphics system has a satisfactory display rate at a particular performance level. However, for many graphics system the graphical complexity corresponds to a high level of three dimensional graphics complexity, an ordinary level of three dimensional graphics complexity, and a much lower level of complexity for two-dimensional graphics. The threshold levels are preferably selected with two considerations in mind. First, it is desirable that the graphics system enters a lower performance mode having reduced power and cooling requirements when the graphical activity is such that the highest performance level is not likely to be required for an extended period of time. Second, it is desirable that the graphics system enters a higher performance mode, in response to increased graphical activity, quickly enough that the user does not perceive a slow down of the graphics system.

In a pipelined graphics system there is a sequence of operations performed by the different stages of the graphics system. Each block (e.g., grouping of one or more stages performing a graphics operation) typically requires the output of one or more other stages as inputs in order to perform its function. Thus, when individual blocks of the graphics system become over-utilized they slow down the performance of downstream blocks, which may result in a decrease in display rate of the graphics system.

One technique that may be used to calculate over-utilization and under-utilization conditions is to calculate a utilization factor corresponding to the percentage of clock cycles for which one or more blocks of the graphics system are stalled (i.e., held up) waiting for data from prior block(s) of the graphics system. If the utilization factor exceeds a threshold level there will be a high percentage of clock cycles for which one or more stages are held up because they are waiting for the output of previous stage. Consequently, for this case an increase in the performance level that increases the performance of blocks prior to the stalled blocks may allow the prior blocks to keep up, thereby increasing the display rate. Consequently, in one embodiment the performance level is increased when a utilization factor exceeds a pre-selected threshold. Conversely, if a utilization factor is comparatively low, there will a comparatively small percentage of clock cycles for which one or more blocks of the graphics system are stalled waiting for data from the prior block(s) of the graphics system. Consequently, if the utilization factor is sufficiently low, a reduction in performance level may be possible while maintaining a minimum display rate.

In one embodiment, a core clock domain utilization factor (CCDUF) is calculated by monitoring a pipeline parameter of a pipeline stage indicative of the graphics pipeline being busy. In one embodiment, this is performed by monitoring the transform and lighting stage or the shader stage. For example, the utilization may be calculated by determining a percentage of clock cycles in the pipeline stage for which one stage is held up waiting for another stage. For example, one logical condition that may be used is that CCDUF corresponds to the percentage of clock cycles that the logical condition CCDUF=% of clock cycles for which "raster waiting for shader" OR "Idx has vertex but Xform is busy" is TRUE. These exemplary conditions correspond to a raster stage waiting for a shader or that an index processor (Idx) has fetched vertex data but that the transform and lighting stage (Xform) is busy. This corresponds to clock cycles in which the graphics pipeline is held up.

In one embodiment a memory clock domain utilization (MCDUF) factor is calculated by monitoring a graphics memory interface parameter, (e.g., the frame buffer memory controller). In one embodiment, MCDUF is defined by the percentage of clock cycle in which the memory frame buffer DRAM controller (FBDRAMC) is both in an idle state and a refresh state, which can be expressed by the expression: MCDUF=% clock cycles for which "FB DramC State !=IDLE" AND "FB DramC State !=REFRESH" is TRUE. This corresponds to a state in which the memory bandwidth is inadequate (i.e., the frame buffer is idle during a refresh) such that the frame rate may decrease.

In one embodiment, the system is polled at least about once a second to measure CCDUF and MCDUF. In an exemplary embodiment, if the CCDUF is greater than 30% or the MCDUF factor is greater than 40% an over-utilization condition is detected for which the performance level is increased. Conversely a performance level reduction to the next lowest supported performance level is triggered after a preselected time (e.g., 20 seconds) if CCDUF is less than 10% and the MCDUF is less than 20%, corresponding to an extended under-utilization condition.

It will be understood that the present invention may be operated as part of a graphics system in which performance levels may be set manually, set completely by other software entities, or the range of automatically adjustable levels is limited manually or by software agents. Consequently, in some embodiments performance level controller 150 has operating modes that may, for example, be set by enable signals. In some embodiments, performance level controller 150 is disabled when the performance level is manually set or set by another software entity in the graphics system. It will also be understood that in some embodiments the performance level controller 150 has a mode in which it is allowed only a limited range of performance levels to adjust, such as only between a plurality of high performance levels 225 in response to a high performance enable signal. Alternatively, in some embodiments, performance level controller 150 has at least one mode in which it selects only between high performance 3D level 220 and low power 3D performance level 215.

The present invention provides several benefits. First, it automatically adjusts the performance level, which adapts the performance level at a minimum performance level sufficient to provide a minimum number of frames per second. This provides the user with a performance level sufficient to maintain a pleasant user experience despite changing graphical demands. Second, the graphics system is not maintained at a performance level higher than necessary, which reduces the power consumption, cooling requirements, and degradation (aging) of the graphics system.

It will be understood that the performance level controller functionality may be implemented, in part, as a software module. An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of operating a graphics system having a sequence of at least two discrete performance levels where each performance level is defined by a core clock rate of a graphics processing unit and a memory clock rate, the performance levels including a high performance level for processing complex three-dimensional graphical images and at least one lower power, lower performance level for processing less complex graphical images, the method comprising:

monitoring a single graphics pipeline in a graphics processor core clock domain, the single graphics pipeline having a set of stages in which graphics data is processed in a pipelined sequence through each subsequent stage in the graphics pipeline and detecting as a function of time a percentage of clock cycles for which a downstream stage of the graphics pipeline is held up waiting for data inputs from an upstream stage of the graphics pipeline as an indicator of utilization and determining whether the graphics pipeline is under-utilized or over-utilized, wherein the downstream stage and the upstream stage of the graphics pipeline both operate in accordance with a clock rate in the graphics processor core clock domain;

in response to detecting a level of utilization greater than a non-zero, over-utilization threshold percentage level for which a display rate of the graphics system is likely to be significantly decreased below a normal display rate, selecting a higher performance level to increase the clock rate in the graphics processor core clock domain;

in response to detecting a level of utilization below a non-zero, under-utilization threshold percentage level, selecting a lower performance level to reduce the clock rate in the graphics processor core clock domain to reduce power required by the graphics system; and operating the graphics system at the core clock rate and memory clock rate associated with the selected performance level, the selected performance level being a minimum performance level sufficient to maintain the display rate within the normal range.

2. The method of claim 1, wherein said at least two discrete performance levels include a low power two-dimensional graphics performance level, a standard two-dimensional graphics performance level, a low power three-dimensional graphics performance level, and a high performance three-dimensional graphics performance level.

3. The method of claim 1, wherein the non-zero, over-utilization threshold percentage level is different from the non-zero, under-utilization threshold percentage level.

4. A graphics system, comprising:

a graphics processor having a graphics pipeline in a graphics processor core clock domain, the graphics pipeline having a set of stages in which graphics data is processed in a pipelined sequence through each subsequent stage in the graphics pipeline, the graphics processor having a sequence of at least two discrete performance levels where each performance level is defined by a graphics processor core clock rate of the graphics processor and a memory clock rate;

a graphics memory coupled to said graphics processor by a graphics bus and operable at said memory clock rate;

a performance level controller, said performance level controller configured to monitor as function of time a percentage of clock cycles for which a downstream stage of the graphics pipeline is held up waiting for data inputs from an upstream stage of the graphics pipeline as an indicator of utilization and determining whether the graphics pipeline is under-utilized or over-utilized, wherein the downstream stage and the upstream stage of the graphics pipeline both operate in accordance with a the clock rate in the graphics processor core clock domain; and in response to detecting a level of utilization greater than an upper bound corresponding to a non-zero, over-utilization threshold percentage level, said performance level controller configured to increase said performance level to increase the clock rate in the graphics processor core clock domain to avoid over-utilization of said graphics pipeline;

in response to detecting a level of utilization below a lower bound corresponding to a non-zero, under-utilization threshold percentage level, said performance level controller configured to decrease said performance level from a high performance level to a lower performance level to decrease the clock rate in the graphics processor core clock domain to avoid under-utilization of said graphics pipeline;

the graphics system operating at the core clock rate and memory clock rate associated with the performance level selected by the performance level controller, the selected performance level being a minimum performance level capable of maintaining the display rate within a normal range.

5. The graphics system of claim 4, wherein the performance levels include a low power two-dimensional graphics performance level, a standard two-dimensional graphics performance level, a low power three-dimensional graphics performance level, and a high performance three-dimensional graphics performance level.

6. The graphics system of claim 4, wherein the upper bound is different from the lower bound.

* * * * *